June 24, 1969    E. A. SLUSSER    3,452,351
METHOD OF INDICATING DISTANCE AND POSITION OF
AN AIRCRAFT RELATIVE TO VOR
Filed June 26, 1968    Sheet 1 of 2

TYPICAL VOR INSTRUMENT APPROACH PROCEDURE

INVENTOR
EUGENE A. SLUSSER
BY Semmes and Semmes
ATTORNEYS

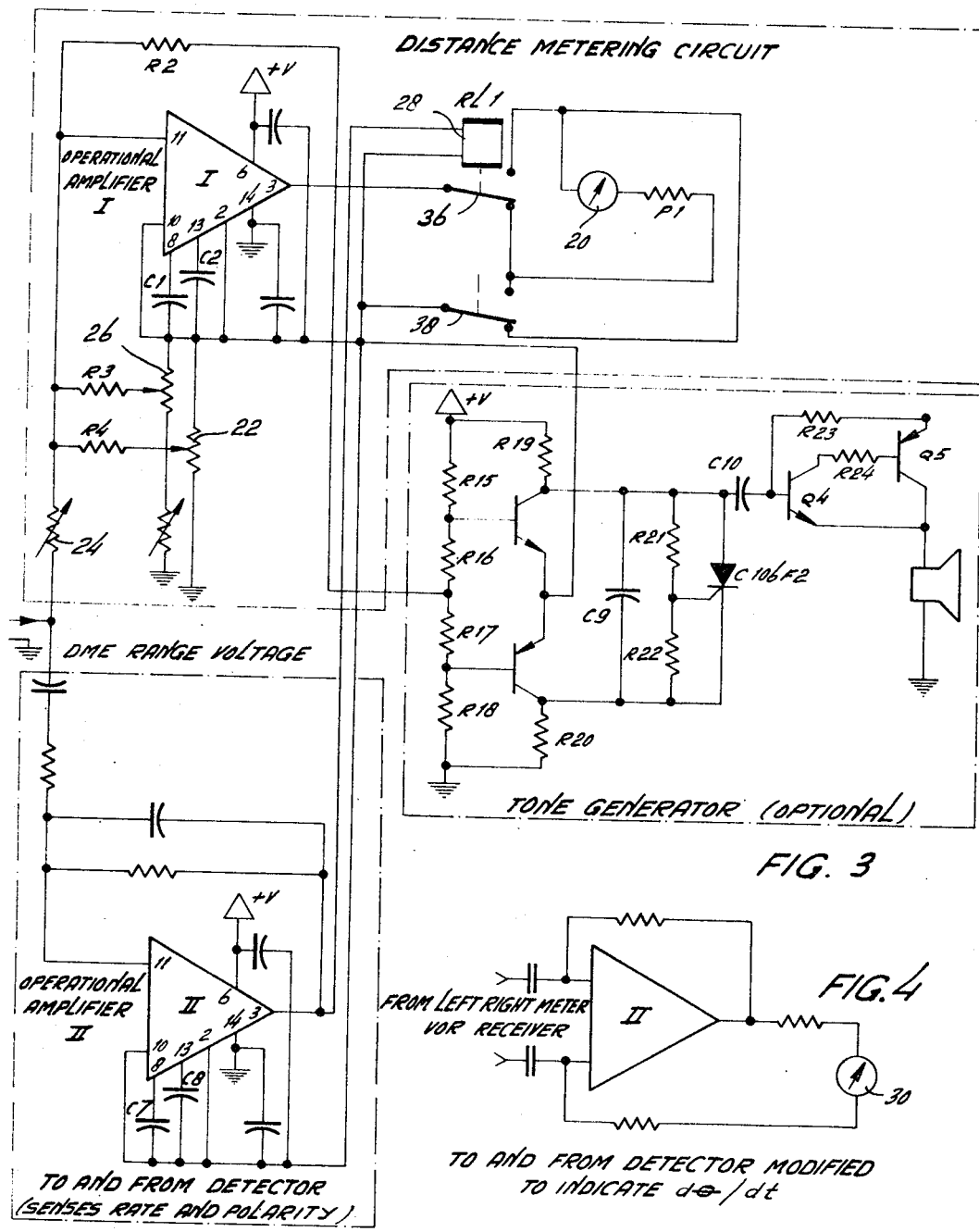

United States Patent Office 3,452,351
Patented June 24, 1969

3,452,351
METHOD OF INDICATING DISTANCE AND POSITION OF AN AIRCRAFT RELATIVE TO VOR
Eugene A. Slusser, Contoocook, N.H., assignor to Aerotronic Associates, Inc., Contoocook, N.H., a corporation of New Hampshire
Filed June 26, 1968, Ser. No. 740,286
Int. Cl. G01s 9/56
U.S. Cl. 343—6            9 Claims

ABSTRACT OF THE DISCLOSURE

Aircraft navigation, particularly a method of discriminating between miles TO and miles FROM a particular VOR or fix.

BACKGROUND OF THE INVENTION

The invention

Aircraft "distance measuring equipment" particularly a method for adapting conventional distance measuring equipment to visually display miles TO and FROM a predetermined VOR or fix and including a method for indicating rate of change of azimuth.

Description of the prior art

Conventional distance measuring equipment may include both distance measuring equipment (DME) and a VOR receiver which may or may not provide azimuth information. The pilot is required to manually preset azimuth position on the VOR receiver prior to obtaining a miles TO/FROM distance readout. In the event of manual or mental error by 180° the TO/FROM readout will be correspondingly in error with the result that miles TO would be indicated as miles FROM the VOR or fix. There has not been provided in the prior art a method for positively indicating miles TO/FROM the VOR or fix and continuously, visually displaying this readout or correlating this readout with a readout in change of azimuth.

Pertinent prior art is discussed below:

Unger 3,055,617 discusses a visual omni directional range station monitor. The purpose of Unger's monitor is apparently to detect more accurately the cone of ambiguity over a VOR station. Basically applicant also detects this cone of ambiguity, but applicant's method is based on range from VOR. According to applicant's method, as the aircraft approaches the VOR station the range progressively decreases to zero and applicant's rate detector gives "TO" indication. As the aircraft passes over the VOR a "FROM" indication is automatically received and the distance is indicated as distance FROM the station. Unger's device does not specifically indicate miles TO or FROM, that is whether the aircraft is travelling TO or FROM the fix.

Held 3,142,062 relates to an improvement on the VOR navigational system. Held does not use distance information and involves only azimuth. In Held the $d\theta/dt$ is also independent of azimuth.

Hansel 3,173,140 refers to a Doppler VOR range direction finder, which again, provides only azimuth information of a high quality and provides no distance information or tracking information as in applicant's added $d\theta/dt$ readout.

Bostiwick 3,234,552 provides a means of locating intersections, these being intersections either from two VOR's or from a VOR and an ILS and, therefore, these intersections are based on the azimuth from the two stations involved. There is no relation to the $d\theta/dt$ function. Applicant uses only range or distance information but will, when used in conjunction with a VOR station, provide a fix at a point. In applicant's method the VOR provides the azimuth information and applicant senses and continuously displays the range along the specific radial.

Saban 3,281,844 is primarily concerned with a system which will give an "off radial" course system to locate the aircraft accurately at other given points. Applicant does not attempt to locate the aircraft except place the fix in a given radius from the station. The actual azimuthal locating of the fix would be done by means of a radial from a VOR. As distinguished from Saban, applicant senses distance or range from the VOR over the radial, discriminates as to whether the aircraft is approaching or leaving VOR and displays range along the azimuth as miles TO/FROM VOR.

SUMMARY OF THE INVENTION

According to applicant's method, the distance and position of an aircraft relative to a VOR station or fix is determined by first using conventional distance measuring equipment. As distance of the aircraft to the VOR station or fix is measured, an operational range voltage is developed as a function of the distance; the amplitude of the range voltage is sensed as the distance position of the aircraft with respect to the VOR or fix; this capability is admittedly inherent in prior art devices. However, the prior art systems are not capable of discriminating as to whether the distance position is TO or FROM the VOR or fix.

According to applicant's method the rate of change of amplitude is sensed, if the amplitude is increasing the distance position is extrapolated and indicated as miles TO the VOR or fix. As the amplitude of the operational voltage is sensed as decreasing, the distance position is extrapolated and indicated as miles FROM the fix. Also, an optional tone generator is provided. As operational range voltage amplitude reaches a voltage corresponding to zero over the VOR indicated as zero miles, a tone generator system is cut in to audibly signal aircraft position over the VOR or fix. Modifications of invention include an override or calibration system permitting indicating distance and position of the aircraft relative to a predetermined fix apart from the VOR station and a method for displaying the rate of change of azimuth with respect to VOR.

In a conventional VOR receiver the TO/FROM information is available to the pilot; however, it is not automatically available inasmuch as the pilot must preset the azimuth dial on the VOR receiver to the proper azimuth before a TO/FROM indication can be given. In the event that the pilot "mis-sets" by 180° to TO/FROM information will be in error by 180°. (That is, a TO would be indicated instead of a FROM.) According to applicant's method, a distance position detector detects whether or not the aircraft is flying TO a fix or FROM a fix and automatically displays on a distance position meter the position relative to the fix. No adjustments or settings are necessary by the pilot. The distance position indicator meter is a "range only" indicator and this instrument is to be used in conjunction with a VOR or ADF (for azimuth information) to accurately pinpoint a fix. The distance position indicator meter does, however, have the ability to lead one to the station providing the pilot flies a course with continuous TO indication.

The $d\theta/dt$ function is applicable only to flying TO or FROM the final fix—this fix being the VOR station. It permits the pilot to accurately set up a ground track to the VOR in the last few miles of an instrument approach. The $d\theta/dt$ indicator displays rate of change of azimuth but does not display azimuth as location information.

BRIEF DESCRIPTION OF THE DRAWINGS

FIG. 3 is a circuit diagram illustrating one mode of sensing and displaying distance position, according to the present invention;

FIG. 4 is a fragmentary schematic showing a modified rate sensor component which indicates rate of change of aircraft azimuth.

DESCRIPTION OF THE PREFERRED EMBODIMENTS

Figure 1:
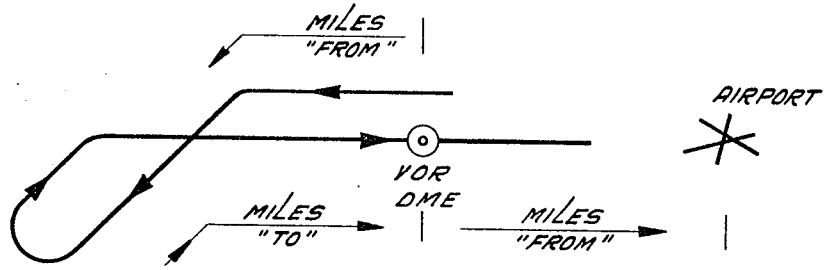
FIG. 1 is a schematic view, illustrating a typical VOR instrument approach procedure.

In FIG. 1 applicant's distance position indicator (DPI) circuitry consists of two operational amplifier circuits and an optional tone generator. The tone generator, when it is used, is gated on when the output of DPI indicates zero miles, resulting in a short audio signal output and is used to notify the pilot of "fix" passage.

All power required to operate the DPI circuitry is taken from the ship's battery. The input signal is taken from conventional distance measuring equipment (DME) distance output.

Operational amplifier I is used as a scaling amplifier, taking the range voltage from the DME and reducing the voltage to a level that can be handled by distance position meter 20. The zero range DC signal level from the DME is balanced out by zero adjust potentiometer 22. The slope of the circuit (volts/mile) is adjusted by the calibrate potentiometer 24 to match the particular DME used. The distance to a fix (or VOR/DME or airport, etc.) is programmed on thumbwheel switch voltage divider 26. Thus, it serves as a distance programming. The circuit can be calibrated in the air as well as on the bench. In the air, zero set potentiometer 22 is adjusted when the airplane is directly over a VOR/DME station. Slope calibration is then adjusted by tuning in another VOR/DME at a known distance from the first, dialing in that distance to the nearest mile on the thumbwheel switch voltage divider 26 and adjusting the calibrate control potentiometer 24 for zero plus or minus the difference between the actual distance and the distance to the nearest mile. The thumbwheel switch voltage divider 26 is calibrated at the time of manufacture and should never need any further adjustment.

Operational amplifier II is used as a rate (mile per hour) detector with a polarity sensor or switching relay 28 and needs no calibration or adjustment. It is a long term differentiator circuit set to energize a relay when the airplane is approaching the VOR/DME station at a rate greater than a fixed rate—say 60 miles per hour. The relay reverses distance position meter 20 polarity to give a TO/FROM indication.

The rate detector amplifier II can also be used to indicate $d\theta/dt$ by modifying it as shown in FIG. 4. Polarity switching relay 28 would be replaced by "left/right" meter 30 and the differential input would be connected across the "left/right" meter. In this way the rate of change in the "left/right" meter would be converted to a voltage and displayed on the $d\theta/dt$ meter.

As illustrated in FIG. 3, operational amplifier I and II take the range voltage output from the DME. The latter is of commencial manufacture and is normally already installed in the aircraft.

Figure 2:
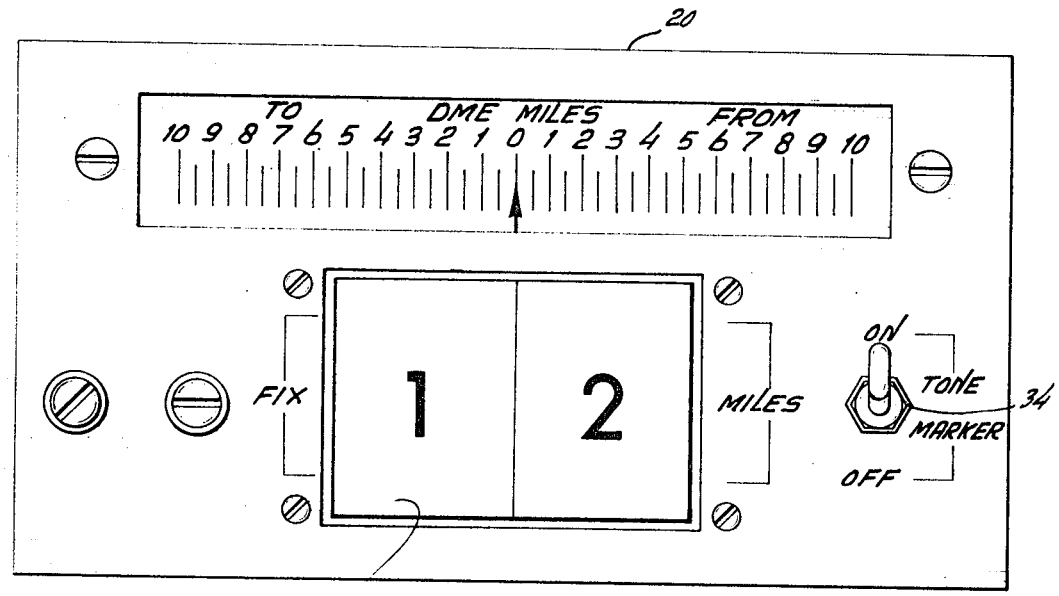
FIG. 2 is a front elevation of a proposed distance position indicator meter, according to the present invention.

The range voltage is displayed on distance position meter 20 which indicates 10-0-10 miles full scale as illustrated in FIG. 2. Calibration to the left of the zero is identified as miles TO the station, and to the right, miles FROM the station. Zero corresponds to a fix and may or may not be the VOR/DME station location. TO is read out in flight toward the fix and FROM in flight parallel to or away from the fix.

One advantage of applicant's display scale is the expanded readout not normally available on many distance measuring equipment DME units. For example, on the Narco UDI-4 one mile is slightly more than one needle width.

Manifestly, various types of amplifiers, polarity switching relays and indicating meters may be employed without departing from the spirit and scope of invention as defined in the claims.

I claim:
1. Method of indicating the distance and position of a vehicle relative to a VOR station using conventional distance measuring equipment comprising:
   (A) measuring distance of said vehicle to the VOR station and developing an operational range voltage as a function of said distance;
   (B) sensing amplitude of said range voltage as distance of said vehicle from said VOR station;
   (C) marking rate of change of amplitude, as a function of vehicle travel TO and FROM said VOR station; and
   (D) polarity switching a distance measuring display on "miles TO", as said amplitude increases; and
   (E) polarity switching said distance measuring display on "miles FROM", as said amplitude decreases.

2. Method of indicating the distance and position of an aircraft relative to a VOR station using conventional distance measuring equipment comprising:
   (A) measuring distance of said aircraft to the VOR station and developing an operational range voltage as a function of said distance;
   (B) sensing amplitude of said range voltage as distance of said aircraft from said VOR station;
   (C) marking rate of change of amplitude, as a function of aircraft travel TO and FROM said VOR station; and
   (D) polarity switching a distance measuring display on "miles TO", as said amplitude increases; and
   (E) polarity switching said distance measuring display on "miles FROM", as said amplitude decreases.

3. Method of indicating the distance and position of a vehicle as in claim 1, including:
   (F) displaying miles TO and FROM said VOR in a linear display.

4. Mehod of indicating the distance and position of an aircraft as in claim 3, including:
   (G) setting a fix apart from said VOR by varying the amplitude voltage set of said VOR and calibrating.

5. Method of indicating the distance and position of an aircraft relative to a VOR station as in claim 4, including:
   (H) initially setting aircraft location as miles FROM in said linear display.

6. Method of indicating the distance and position of an aircraft relative to a VOR station as in claim 4, including:
   (H) sensing zero amplitude of said range voltage corresponding to zero miles; and (I) audibly signalling as said aircraft passes over said VOR and said zero amplitude is sensed.

7. Method of indicating the distance and position of an aircraft relative to a VOR station as in claim 6, then
(J) displaying miles FROM said station as said aircraft passes over VOR.

8. Method of indicating distance and position of an aircraft relative to a VOR station as in claim 6, including:
(K) over riding sensing of the rate of change of amplitude to display miles FROM, except as said aircraft approaches VOR at a predetermined fixed rate.

9. Method of indicating the distance and position of an aircraft relative to a VOR station as in claim 8, including sensing left and right amplitude and displaying as rate of change of azimuth to indicate actual ground track of said aircraft with respect to VOR.

References Cited

UNITED STATES PATENTS

| | | | |
|---|---|---|---|
| 2,699,539 | 1/1955 | Sylvander | 340—27 |
| 3,055,617 | 9/1962 | Unger et al. | 343—106 X |
| 3,142,062 | 7/1964 | Held | 343—106 |
| 3,171,121 | 2/1965 | Solga | 343—112 |
| 3,173,140 | 3/1965 | Hansel | 343—106 |
| 3,234,552 | 2/1966 | Bostwick | 343—106 |
| 3,281,844 | 10/1966 | Sabin | 343—106 |

RODNEY D. BENNETT, JR., *Primary Examiner.*

H. C. WAMSLEY, *Assistant Examiner.*

U.S. Cl. X.R.

340—27; 343—106